United States Patent [19]

Coltrinari et al.

[11] 4,011,146

[45] Mar. 8, 1977

[54] PROCESS FOR SEPARATION AND RECOVERY OF METAL VALUES FROM SULFIDE ORE CONCENTRATES

[75] Inventors: Enzo L. Coltrinari, Arvada; James E. Reynolds, Golden, both of Colo.

[73] Assignee: Cyprus Metallurgical Processes Corporation, Los Angeles, Calif.

[22] Filed: Nov. 13, 1975

[21] Appl. No.: 631,700

Related U.S. Application Data

[63] Continuation-in-part of Ser. No. 516,450, Oct. 21, 1974, abandoned.

[52] U.S. Cl. .................................. 204/66; 75/112; 75/113; 75/118 R; 75/120; 204/98; 204/99; 204/109; 204/111; 204/114; 204/115; 204/117; 204/118; 204/128; 204/129; 423/38; 423/39; 423/40; 423/46; 423/94; 423/98; 423/99; 423/103; 423/109; 423/494; 23/270 R

[51] Int. Cl.² .................. C01G 5/00; C01G 21/16; C25C 3/34

[58] Field of Search ............... 204/66, 98, 99, 109, 204/111, 114, 115, 117, 118, 128, 129; 423/38–40, 46, 94, 98, 99, 103, 109, 494; 75/111–114, 118, 120

[56] References Cited

UNITED STATES PATENTS

| 739,374 | 9/1903 | Baker et al. | 423/46 |
|---|---|---|---|
| 1,375,002 | 4/1921 | Hirt | 423/46 |
| 1,402,732 | 1/1922 | Avery | 423/98 |
| 1,539,713 | 5/1925 | Christensen | 204/11 X |

OTHER PUBLICATIONS

Ionidas, "The Dry Chlorination of Complex Ores", Mining and Scientific Press, vol. 112, pp. 781–789, May 1916.

*Primary Examiner*—G. L. Kaplan
*Assistant Examiner*—Aaron Weisstuch

[57] ABSTRACT

An improvement in conventional processes for recovering metal values from sulfide ores containing lead, zinc and silver sulfides in which process the metal sulfides are converted to chlorides by chlorination followed by solubilization of the chlorides with a sodium chloride leach and subsequent recovery of the metals from their chlorides in accordance with a conventional flow sheet including crystallization, cementation, precipitation, fused salt electrolysis, etc., with chlorine being recovered for reuse by electrolysis of the sodium chloride leach solution substantially depleted of lead, silver and zinc, the improvement being a pollution-free process which comprises:

1. recycling the sodium chloride solution depleted of a major percentage of lead and silver to the sodium chloride or brine leaching step; and 2. controlling the concentration of zinc and other impurities in the sodium chloride or brine leaching solution by bleeding a portion from the recycle stream of (1) above, removing lead, zinc and other metal impurities from the bleed stream, electrolyzing the bleed stream to produce chlorine, sodium hydroxide and a weak sodium chloride solution followed by recycle of the chlorine to the dry chlorination step and weak sodium chloride solution, after concentration, to the leach solution to control the concentration of zinc chloride and other impurities in the leach solution. A further improvement is the use of an alternate dry chlorination procedure for the sulfide ores and, particularly, ores such as the tetrahedrite-tennantite series which are more satisfactorily chloridized by dry chlorination than by wet chlorination. Another improvement is use of a flow sheet by which no impurities are removed from the process in the form of chlorides so that no chlorine is lost from the system.

26 Claims, 2 Drawing Figures

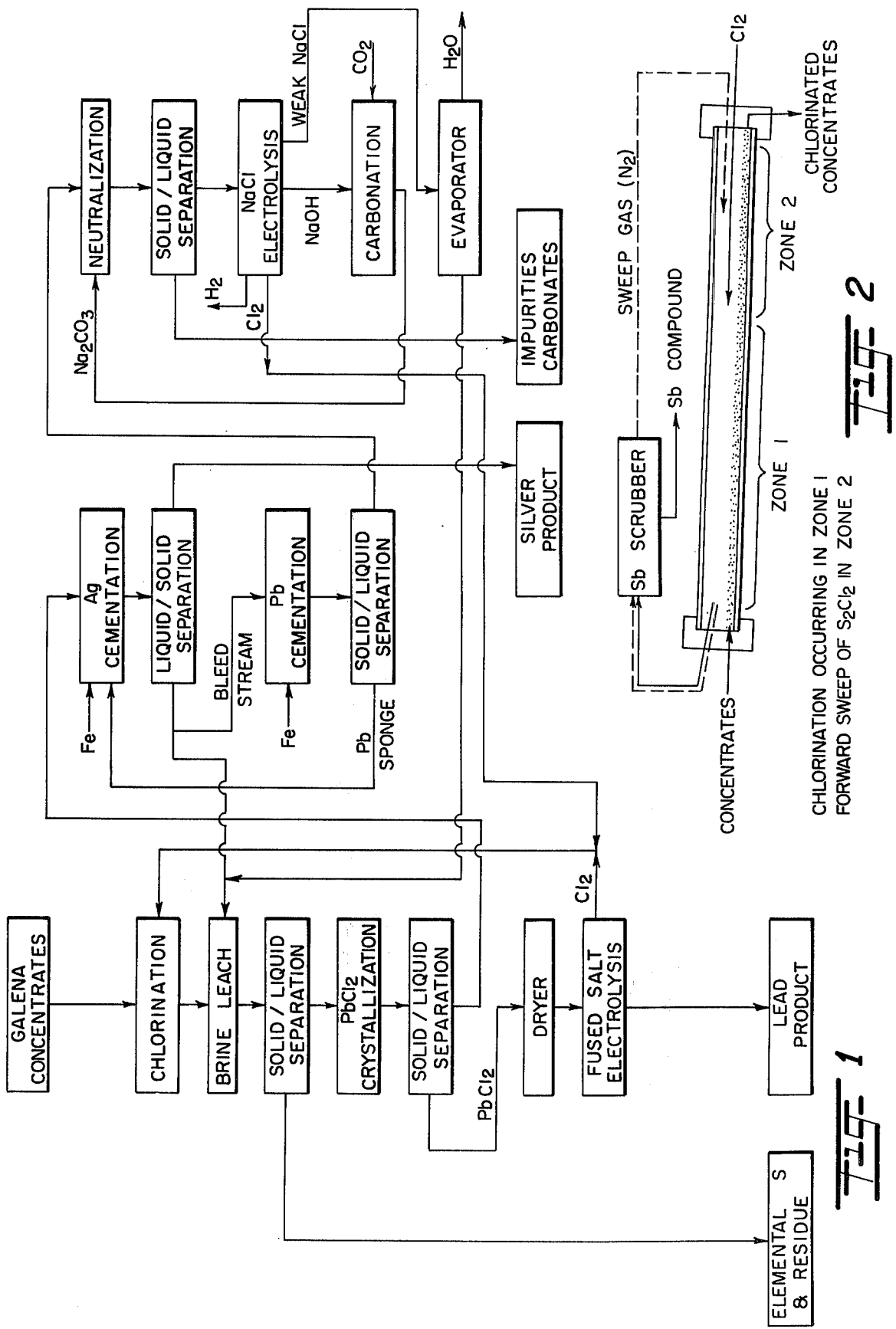

PROCESS FOR SEPARATION AND RECOVERY OF METAL VALUES FROM SULFIDE ORE CONCENTRATES

CROSS-REFERENCES TO RELATED APPLICATIONS

This application is a continuation-in-part of our application Ser. No. 516,450 filed Oct. 21, 1974, now abandoned.

BACKGROUND OF THE INVENTION AND PRIOR ART

The invention comprises chlorinating sulfide ore concentrates to convert the metal sulfides therein to chlorides from which the metals are subsequently recovered in accordance with a flow sheet to be described. The invention includes the flow sheet irrespective of the chlorination procedure, and the combination of the flow sheet with the chlorination step. Lead and silver are the principal metals which can be economically recovered from the ores. A further feature of the invention is the use of dry chlorination procedure which is particularly effective on the tetrahedrite-tennantite series of sulfide ores.

Conversion of metallic sulfides into chlorides in metal recovery processes is not broadly new. Aqueous chlorination of metal sulfide concentrates, with ferric chloride and chlorine gas in a sodium chloride or calcium chloride solution has been performed. U.S. Pat. No. 1,736,659 to Mitchell discloses a process exemplifying this mode of recovery of metal values from sulfide ores using a wet chlorination process. The process of this patent does not include recycle of leach solution or sodium chloride solution, includes a roasting step with consequent air pollution, includes removal of chloride from the system in the lead chloride, removal of iron from the system as the hydroxide rather than carbonate, and differs in other aspects from the flow sheet of this invention.

Another publication of interest is the article entitled "The Dry Chlorination of Complex Ores" by Ionidas in *Mining and Scientific Press*, Volume 112, May 27, 1916. This article discloses partially dry chlorinating concentrates of metal sulfides, including lead, zinc and silver sulfides, with chlorine gas with final chlorination being accomplished in a roasting step in the presence of air in which the ferric chloride formed in the chlorination step is decomposed to produce chlorine which completes the chlorination of the metal sulfides. The process is directed chiefly to the production and electrolysis of zinc chloride and is not a pollution-free process as sulfur dioxide is produced in the roasting step and released to the atmosphere. The procedure for recovering metal from the chlorides in this process lacks the features which the process of the Mitchell patent lacks as outlined above and differs in other respects from the flow sheet of the present invention.

It has been found that when the chlorination product of this invention is treated with sodium chloride to solubilize the metal chlorides, an undesirable build-up of impurities, particularly zinc chloride, in the brine leach solution occurs which adversely affects the ability of the solution after a period of time to solubilize silver and lead chlorides from the chlorinated ore product. The present process provides a means for overcoming this problem and obtaining high recoveries of silver and lead.

The tetrahedrite-tennantite polymorphic series of metal sulfide minerals is discussed at page 181 of Dana's "Manual of Mineralogy," 15th Edition, published by John Wiley and Sons, New York, New York. The formula for tetrahedrite is given as $(Cu,Fe,Zn,Ag)_{12}Sb_4S_{13}$. Arsenic may take the place of antimony in the pure arsenic end member, tennantite.

These minerals are extremely refractory to chemical leaching. As an illustration of the difficulty of leaching them, it is disclosed at page 72 of the book entitled *The Chemistry of Hydrometallurgical Processes* by Alfred Richard Burkin that tetrahedrite was leached with concentrated sodium sulfide solution. This is an extreme procedure.

The minerals are known to occur with other minerals such as, galena, and the amount of lead in the combined minerals has always contributed to the economic feasibility of processing this ore to recover principally lead and silver. The present high price of silver makes it economically attractive to recover the silver from the tetrahedrite-tennantite minerals irrespective of whether other minerals are associated with them. It is known that in some galena-tetrahedrite ore, some silver sulfide is in the galena while the remainder of the silver is locked in the lattice of the tetrahedrite crystals from which it is very difficult to release so that it is available for conversion to the soluble chloride from which the silver is readily recoverable by cementation or other conventional means.

It has been conventional to recover lead and silver from galena-tetrahedrite ores by pyrometallurgical processes with conversion of the sulfur present to sulfur dioxide which was released to the atmosphere with its polluting effect. In view of comparatively recent restrictions on the permissible sulfur dioxide content of the atmosphere there is a demand for non-pollution processes for recovering silver and other metals from the tetrahedrite-tennantite series of minerals alone or in combination with other minerals.

The difficulty of breaking down the minerals to make the sulfide components thereof available for chlorination is not solved by the use of conventional processes used on ores other than tetrahedrite-tennantite minerals of somewhat similar composition. For example, U.S. Pat. No. 1,736,659, mentioned above, discloses a process for recovering metals from sulfide ores including the metals lead and silver in which the metal sulfides are converted to chlorides by wet chlorination with calcium chloride solution. As the test results hereinafter presented show, wet chlorination is not effective to convert the metals of the tetrahedrite-tennantite series to chlorides without use of an excessive amount of chlorine, excessive process time and without reduced yields of metals.

A dry chlorination technique for ores containing lead, zinc and silver is disclosed in the article mentioned above entitled "The Dry Chlorination of Complex Ores" by C. A. Ionidas, dated May 27, 1916, published in Volume 112 of *Mining and Scientific Press*. The process was developed for processing complex sulfide ores containing zinc which could not be treated profitably by other means and is directed essentially to the recovery of zinc by fused bath electrolysis, "the most vital step in the whole process... ." The process is used on ores having a high content of iron so that only a partial chlorination is performed followed by a roasting step "in the presence of air" to regenerate chlorine consumed in the initial formation of ferric chloride.

The present dry chlorination procedure cannot be conducted in the presence of oxygen, either contained in air or otherwise if a pollution-free process is desired, because the sulfur released is immediately oxidized to sulfur dioxide in the presence of oxygen. The article discloses a process performed on an ore not containing arsenic or antimony differing widely from tetrahedrite-tennantite ores. The statement on page 787 postulating that the process is effective on ores containing arsenic and antimony obviously does not include ores of the tetrahedrite-tennantite series. Certainly, a pollution-free process was not contemplated in view of the roasting step performed in the presence of air.

BRIEF STATEMENT OF THE INVENTION

The invention is an improvement in processes for treating sulfide ore concentrates containing lead, silver and zinc sulfides to recover principally silver and lead, part of the improvement comprising conducting the recovery of the metals from their chlorides resulting from the chlorination step in a manner to prevent build-up of impurities, including zinc chloride, in the sodium chloride leach solution used to solubilize the metal chlorides formed in the chlorination step. The process includes as an alternate to wet chlorination of the sulfides a dry chlorination procedure using dry chlorine gas to convert the sulfides to chlorides, the sulfide sulfur to elemental sulfur, and volatilize the chlorides of arsenic and antimony if these metals are present followed by solubilizing the chlorides with sodium chloride solution. Although the dry chlorination step can be performed above the melting point of sulfur, the preferred temperature range is between 50° C and the melting point of sulfur with the most preferred temperature range being 80° C to about the melting point of sulfur. During the dry chlorination step, the sulfur chlorides formed are contacted by means of an inert sweep gas with ore to convert them to metal chloride and elemental sulfur so that substantially no sulfur chlorides are released to the atmosphere. The dry chlorination procedure is particularly effective on sulfides of the tetrahedrite-tennantite series alone or combined with some other mineral, such as galena.

After chlorination of the sulfides by whatever method the metal chlorides are separated from the resulting solution and the metals lead and silver, which are of principal interest, recovered from the separated aqueous chlorides. Lead chloride is crystallized out of the solution by cooling and lead recovered from the lead chloride by fused salt electrolysis with the chlorine produced being recycled to the chlorination step. The silver is removed from the lead chloride-depleted solution by cementation. The lead and silver-depleted solution, from which a bleed stream is separated, is recycled to the sodium chloride brine leach. The bleed stream after final removal of lead and silver therefrom by iron cementation is neutralized with sodium carbonate to remove zinc and other metal impurities therefrom as carbonates followed by electrolysis of the resulting solution to produce chlorine which is recycled to chlorination, with some of the weak sodium chloride electrolyte, after concentration, being recycled to the sodium chloride brine leach solution, the procedure preventing build-up of zinc and other impurities therein in the continuous process, and sodium hydroxide from the electrolysis being carbonated and recycled to the neutralization step.

It is an important feature of the process that the separation of the prescribed amount of bleed stream from the recycled sodium chloride leach solution, and the subsequent recycling thereof to the sodium chloride leach after removal of zinc and other metal impurities therefrom, results in zinc chloride being removed from the brine leach solution substantially at the rate it is being added to thereby prevent its build-up in the brine leach solution with resultant inhibition of the solubilization of lead chloride. Another important feature of the invention is the conservation of chlorine feature in which no chlorine leaves the system as chloride in impurities or otherwise but any removal of chlorine is as chlorine gas through electrolysis so that it can be recycled to the dry chlorination step without any substantial loss of any chlorine introduced into the system either for dry or wet chlorination. A distinct advantage of the process is that it is pollution-free with no chlorine or lead vapors or compounds being released to the atmosphere and substantially all of the sulfide sulfur being converted to elemental sulfur rather than to sulfur dioxide as in the prior pyrometallurgical processes.

BRIEF DESCRIPTION OF THE DRAWINGS

The present process will now be described with reference to the annexed drawings, wherein:

FIG. 1 is a generalized flow sheet illustrating the process of the present invention performed as a continuous process.

FIG. 2 is a diagrammatic illustration of a rotary kiln for conducting the gas/solid dry chlorination step of the process of the invention countercurrently when dry chlorination is used.

DETAILED DESCRIPTION OF THE PROCESS AND SPECIFIC EXAMPLES

The present invention will be illustrated with respect to a galena/tetrahedrite concentrate on which a dry chlorination procedure was used. It is to be understood that this process is applicable to other ores containing the sulfides of lead, silver and zinc and that chlorination is not restricted to dry chlorination as wet chlorination can be used. The dry chlorination procedure will be described in connection with illustrative examples before description of the process for recovering metals from the chlorides.

In order to compare the effectiveness of dry chlorination and wet chlorination processes based on the silver extracted, amounts of chlorine used, and process time, a sample of residue containing crystalline tetrahedrite was treated with both a wet chlorination procedure and the dry chlorination process of this invention with the comparative results obtained being set forth below.

In order to obtain the sample of tetrahedrite from the available galena-tetrahedrite concentrate, the latter was treated as described below to remove most of the lead sulfide.

Commercial galena-tetrahedrite concentrates were leached in acidic 450 g/l $CaCl_2$ + 30 g/l $Fe^{+3}$ solution at 90° C maintaining EMF. at 400–450 mv by injecting gaseous $Cl_2$ into slurry for 1.5 hours. The term "EMF" refers to oxidation-reduction potential of an indicator electrode versus a reference electrode. The residue was filtered, washed well with hot 450 g/l $CaCl_2$ solution, then $H_2O$, and dried at 60° C.

| Assay of Residue | % | | % |
|---|---|---|---|
| | Ag .58 | Zn | 14 |
| | Pb 1.2 | Sb | 1.9 |
| | *S' 64 | Cu | 2.1 |
| | **S° 51 | Fe | 4.7 |

*Total sulfur
**Elemental sulfur

The difference between the total sulfur and the elemental sulfur is the combined sulfur in the metal sulfides, the elemental sulfur resulting from the conversion of lead sulfide to lead chloride.

The wet chlorination process was performed on the tetrahedrite-sulfur residue as described in the following example with results in chlorine consumption, process time and silver extracted being given:

EXAMPLE I

EXAMPLE I

| Aqueous Chlorination | | |
|---|---|---|
| Conditions: | Pulp Density | 39 g residue/1000 ml solution |
| | Leach Solution | 450 g/l $CaCl_2$, 58 g/l Zn, 31 g/l $Fe_{+++}$, 6 g/l Cu, 2 g/l HCl. |
| | EMF. | Maintained at 780–800 mv by injecting $Cl_2$ into slurry in closed system under 2 psig pressure. |
| | Temperature | 94° |
| | Time | 8.2 hours |
| Results: | Ag extracted | 88% |
| | Chlorine consumed | 4285 lb. $Cl_2$/ton feed residue |

Dry chlorination of the tetrahedrite-sulfur residue was performed as described below.

The general reactions occuring in the dry chlorination step are:
1. $MS + Cl_2 \rightarrow MCl_2 + \frac{1}{2} S_2$; where M = Pb, Zn, Cu, Fe, Ag, etc.
2. $S_2 + Cl_2 \rightarrow S_2Cl_2$
3. $MS + S_2Cl_2 \rightarrow MCl_2 + 3/2 \, S_2$
4. $Sb_2S_3 + 5Cl_2 \rightarrow 2SbCl_5 + 3/2 \, S_2$ In order to most efficiently utilize the chlorine, contact of the pulverized concentrate with chlorine gas should be done in a counter-current system as shown in FIG. 2., which is operated to prevent the presence of very little, if any, oxygen entering the reaction area, as the illustrative process is a pollution-free process.

As shown in FIG. 2 of the drawing, the concentrate in finely divided form (ground to − 65 mesh) enters the upper end of a rotary kiln and chlorine gas is introduced at the discharge end of the kiln so that most highly concentrated chlorine gas contacts the more nearly completely chlorinated concentrate. The kiln is an indirect fired kiln; however, since this reaction is exothermic, little, if any, applied heat is required. An inert sweep gas, for example, nitrogen gas, is recirculated along with the chlorine to contact sulfur chlorides with ore entering the reaction zone where the sulfur chlorides are reacted with the sulfide ore to form metal chlorides and elemental sulfur with the result that sulfur chlorides are not products of the reaction as in the process of U.S. Pat. No. 739,374. The length of the kiln is divided into two zones comprising the reaction zone, the zone approaching the discharge end preferably operating at a temperature of approximately 115° C and the upper end of the tube preferably operating at a temperature of from 80°–115° C with the upper temperature range being below the melting point of sulfur. Chlorination occurs primarily in zone 1, and evolution of sulfur chlorides occurs in zone 2. The off-gases containing volatilized antimony pentachloride ($SbCl_5$) are removed in a scrubber and antimony recovered therefrom. If a pollution-free process is desired, substantially no oxygen is admitted to the reaction area.

To avoid excessive stickiness during the reaction, the temperature within the kiln should be maintained below the melting point of sulfur. It is an important feature of the dry chlorination step that it is performed at the relatively low temperatures specified with the conversion of the sulfide sulfur to elemental sulfur so that the disadvantages due to the presence of melted sulfur are eliminated and the sulfur is removed in the solid form rather than as a vapor as in the processes of U.S. Pat. Nos. 846,657 and 1,917,233. In zone 2, heat is applied in order to increase the vapor pressures of sulfur chlorides so that they can be swept forward by the sweep gas, nitrogen.

In addition to the necessity of preventing the escape to the atmosphere of substantial amounts of sulfur chlorides, it is desirable to have a minimum amount of sulfur chlorides in the chlorinated product to avoid an hydrolysis in the subsequent sodium chloride leach performed to dissolve silver chloride. Such a reaction with $S_2Cl_2$, for example, is represented as follows:

$$S_2Cl_2 + 2H_2O = 2HCl + SO_2 + H_2S \text{ (or polythionic acids)}$$

The following example was performed in accordance with the dry chlorination process described immediately above with results being shown in amount of chlorine consumed, process time, and silver recovered.

EXAMPLE II

| Dry Chlorination | | |
|---|---|---|
| Conditions: | Apparatus | Rotary Glass Kiln |
| | Charge | 50 g |
| | Chlorine Addition | 14 g over 70 min. period |
| | Temperature | 75° C |
| | Time | 70 minutes |
| | The chlorinated product was leached in 450 g/l $CaCl_2$ + 30 g/l $Fe^{+3}$ + 5 g/l HCl solution for 1 hour at 93° C. | |
| Results: | Ag Extracted | 94% |

EXAMPLE II-continued

| Dry Chlorination | | |
|---|---|---|
| | Chlorine Consumed | 550 lb. Cl$_2$/ton feed residue |

The results show that 6% more silver was extracted in the dry chlorination process using less than 1/7 the amount of chlorine and 1/7 the chlorination time. Substantially all the sulfide sulfur in the metal sulfides was converted to elemental sulfur while in the wet chlorination process a substantial amount of sulfide sulfur was converted to sulfate. The results illustrate the effectiveness in terms of chlorine consumption, silver recovery, and process time of the dry chlorination process on tetrahedrite-tennantite type concentrates alone. The same type results have been obtained on this type concentrate associated with galena, and, obviously, the ore or concentrate with which the tetrahedrite-tennantite mineral is associated will have little effect on its reaction or breakdown under dry and wet chlorination treatment.

The feature of the invention relating to the recovery of metals from the chlorinated products of the chlorination step will now be described in conjunction with the illustrative example.

The concentrate used in the illustrative example had the following analysis:

| Silver | 0.30% – | 0.35% |
|---|---|---|
| Lead | 68% – | 70% |
| Antimony | 0.80% – | 1.4% |
| Sulfur (Total) | 14% – | 17% |
| Zinc | 4% – | 6% |
| Iron | 2% – | 4% |

The ore concentrate was ground before chlorination to −65 mesh. The ground concentrate was dried as the dry chlorination procedure was used and the dried concentrate subjected to dry chlorination.

Chlorination of the ore was performed with dry chlorine gas in the kiln illustrated in FIG. 2 in accordance with the counter-current system described above. A definite amount of chlorine gas per ton of concentrate is metered into the kiln to substantially convert the lead and silver values to the chlorides in the continuous process. Since the reaction between the lead sulfide (PbS) and chlorine is quite exothermic, some cooling may have to be done in Zone 1, or, alternatively, addition of inert materials, such as sand, recycled product, or the like, as a diluent for the concentrate can be used. In Zone 2, as stated above, heat may be applied in order to increase the vapor pressures of sulfur chlorides so that they can be swept forward by the sweep gas, nitrogen.

The amount of chlorine gas required for chlorination depends upon the composition of the concentrates. For the galena/tetrahedrite concentrates, most of the chlorine is used to chlorinate the galena (PbS). These concentrates assay approximately 70% lead, and the theoretical requirements of chlorine for the reaction PbS + Cl$_2$ = PbCl$_2$ + S per ton of concentrate is 480 lbs. of chlorine. The remaining 100–140 lbs. of chlorine (the total chlorine addition being from 580–620 lbs. of chlorine per ton of concentrate), chlorinates the tetrahedrite and some of the sulfides of other metals such as zinc, iron, copper and others. The following example illustrates the dry chlorination of lead sulfide concentrates and subsequent solubilization of the resultant metal chlorides with sodium chloride in accordance with the flow sheet of the invention.

EXAMPLE III

| Chlorination Conditions | |
|---|---|
| Apparatus | 3 Compartment Rotary Kiln |
| Zone 1 Reaction: | |
| Cl$_2$ Addition | 580–600 lb/ton PbS ore |
| Inert Gas | Nitrogen |
| | N$_2$:Cl$_2$ = 1:1 Vol. Ratio |
| Temperature | 80° C |
| Time | 2 Hr. |
| Zone 2 Reaction: | |
| Inert Gas | Nitrogen |
| Temperature | 110–115° C |
| Time | 1.5 Hr. |
| Leach Conditions | |
| Pulp Density | 50 g Chlorinated Product per liter Leach Solution |
| Leach Solution | 290 g/l NaCl, pH 1.5 |
| Temperature | 95° C |
| Time | 1.5 to 3 Hrs. |

Results

| | Assay, % | | |
|---|---|---|---|
| | PbS Concentrates 100 g | Chlorinated Product 121 g | Leached Residue 18.6 g |
| Ag | 0.34 | 0.28 | .012 |
| Pb | 70 | 58 | .12 |
| Sb | 1.2 | .41 | .098 |
| Zn | 4.5 | 3.7 | 16 |
| Fe | 2.7 | 2.3 | 7.9 |
| Cu | .94 | .80 | .18 |
| Cl | <.1 | 23 | |

% Sb Volatilized During Chlorination = 59
% Extracted During NaCl Leach - Ag = 99.3
Pb = 99.9
Sb = 96
Zn = 33
Fe = 47
Cu = 97

The results of the example show that more than 99 percent of the lead and silver content of the concentrate was converted to the chloride and extracted during the brine leach. In addition a substantial amount of the antimony was recovered. Substantially all of the sulfide sulfur was converted to elemental sulfur in the dry chlorination step.

It was found by using dry chlorination and the flow sheet of FIG. 1 that low temperature (80°–115° C) dry chlorination with controlled chlorine addition (580–620 lbs. of chlorine per ton of concentrate) followed by a sodium chloride leach at 90°–95° C for an hour extracted 99% of the silver, 99.9% of the lead, 33% of the zinc, 47% of the iron, 97% of the copper and 96% of the antimony. During chlorination, antimony was volatilized, probably as SbCl$_5$, and recovered from the off-gases of the chlorination step. Arsenic, if present, can also be recovered in this manner. As stated above, substantially all of the sulfide sulfur in the metal sulfides was converted to elemental sulfur. This is an improvement over pyrometallurgical processes in which the sulfur is released as polluting sulfur dioxide, sulfur chlorides or as sulfur vapor.

The invention will now be further described with reference to the flow sheet of FIG. 1.

The leaching referred to in the example is peformed as follows. Irrespective of whether dry or wet chlorination is used, the flow sheet of FIG. 1 is followed beyond the chlorination step. The chlorinated product is leached in the brine leach with sodium chloride solution to solubilize the lead and silver chlorides, and other metal chloride impurities. After start-up, the brine leach solution is supplemented with recycled sodium chloride in the continuous process, as shown. The leach solution for the tetrahedrite/galena concentrate during operation ordinarily contains from 260–280 grams per liter of sodium chloride, approximately 40 grams per liter of lead, about 0.15 grams per liter of silver, 15–30 grams per liter of zinc, 15–30 grams per liter of ferrous iron, and lesser amounts of copper, antimony, calcium, magnesium, manganese, aluminum, etc. The leaching step, irrespective of the concentrate being processed, is preferably performed at a temperature of from about 80°–100° C. The leach slurry is filtered hot and the residue discarded or processed to recover the elemental sulfur, if desired.

The next step, as appears from the annexed flow sheet of FIG. 1, is the recovery of lead. The solubilized lead chloride is crystallized from the sodium chloride leach solution by cooling from 80°–100° C to approximately 15°–20° C. The crystalline lead chloride is separated from the solution by centrifuging, dried, and electrolyzed in a fused salt cell to produce product lead, and chlorine gas which is recycled to the chlorination step.

The next step is the recovery of silver. The silver is precipitated from the lead chloride-depleted sodium chloride leach solution by cementation with metallic iron or lead to produce an impure silver sponge containing some copper, lead, iron and other trace impurities. This sponge must be refined to produce a pure silver product. The lead and silver-depleted leach solution minus a bleed stream is recycled to brine leach as shown.

About 5–15% of the recycled leach solution is bled off from the main stream as a bleed stream. The main purpose of this is to treat this amount of the main stream as described below to remove impurities, especially zinc chloride, and recycle the impurity-depleted bleed stream to the brine leach, all for the purpose of controlling the concentration of zinc chloride and other impurities in the leach solution. Zinc chloride is known to appreciably decrease the solubility of lead chloride in sodium chloride solutions. Accordingly, in order to maintain maximum dissolution of lead chloride, the zinc chloride and other impurities are removed through the bleed stream at substantially the same rate at which they are introduced from the chlorination step.

Another purpose of the bleed stream and its treatment is to permit removal of the impurities in a form other than chlorides with consequent loss of chlorine from the system, and to recover chlorine as gas so that it can be recycled to the chlorination step without any loss of chlorine from the system.

As shown in the flow diagram, lead remaining in the bleed stream is removed by cementation with metallic iron and the resultant sponge lead recycled to the silver cementation step. Any silver cemented out will be recycled likewise. The lead in solution in the bleed stream is decreased from about 15 grams to 0.2 grams per liter.

The bleed stream is next neutralized with sodium carbonate at a pH of about 8.5 and at a temperature of about 50°–80° C to precipitate zinc, iron and other metal impurities as carbonates in a readily filterable form. Sodium carbonate is used here because its reaction with zinc chloride produces sodium chloride which is subsequently submitted to electrolysis so that no chlorine is lost from the system in the removal of zinc and other impurities.

The bleed solution after solids removal is subjected to electrolysis to produce chlorine gas, sodium hydroxide, and a weak sodium chloride solution. The prior removal of zinc and other impurities from the solution greatly facilitates the electrolysis as the electrolysis is almost physically impossible with zinc and the other impurities present in the electrolyte. The sodium hydroxide is carbonated to produce sodium carbonate which is recycled to the neutralization step. The chlorine gas is recycled to the chlorination step and the impurity depleted sodium chloride bleed solution after concentration is recycled to the leach step to prevent zinc build-up in the leach solution as explained above.

The process can, of course, be performed both continuous or batch.

Based on the results obtained with the process using a dry chlorination procedure a material balance for a typical commercially available lead sulfide concentrate (galena/tetrahedrite) is as follows:

| ESTIMATED MATERIAL BALANCE FOR GALENA/TETRAHEDRITE Lb./Ton Concentrates | | | | | | | |
|---|---|---|---|---|---|---|---|
| Input | Ag | Pb | Sb | Zn | Fe | Cu | S |
| Pbs Concentrates | 6.80 | 1400 | 24.0 | 90.0 | 54.0 | 18.8 | 320 |
| Iron Powder | | | | | 36 | | |
| | 6.80 | 1400 | 24.00 | 90.00 | 90.00 | 18.8 | 320 |
| Products | | | | | | | |
| Lead | | 1385 | | | | | |
| Ag Sponge | 6.70 | 5 | 9 | | 5 | 18 | |
| Sb Chloride | | | 14 | | | | ±10 |
| Leach Residue | 0.10 | 8 | 1 | 60 | 29 | .8 | ±310 |
| Impurities Carbonates | | 2 | | 30 | 56 | | |
| | 6.80 | 1400 | 24 | 90 | 90 | 18.8 | ±320 |

All the chlorine gas added is used internally.

All the chlorine gas added is used internally.

The Material Balance Table shows that theoretically all of the lead and silver can be recovered by the process with the loss of no chlorine from the system. After start-up virtually no chloride addition to the continuous process is needed subject to ordinary losses due to mechanical operations, such as, filtration, concentration, etc.

While the invention has been illustrated by its application to lead, silver and zinc containing tetrahedrite/galena concentrate and the use of a dry chlorination procedure, it is by no means limited to this ore and technique. The invention includes the use of dry or wet chlorination techniques on ores in general containing lead, zinc and silver, the flow sheet beyond the chlorination step being applicable irrespective of the method of chlorination. The flow sheet can be used to recover metals from their chlorides produced by wet chlorination of their sulfides with results comparable to those produced in the example.

It is seen from the above description of the invention that a process has been provided for the recovery of metals from their sulfide ores by chlorination of the sulfides to chlorides and elemental sulfur followed by solubilization of the chlorides with sodium chloride and subsequent recovery of the metals from the chlorides, in which process substantially all of the sulfide sulfur in the ore is converted to elemental sulfur, build-up of zinc chloride and other impurities in the sodium chloride leach solution is prevented, no chlorine is lost from the system by removal of any impurities as chlorides, the chlorine of the metal chlorides from which metals are recovered being recovered as a gas for recycle to chlorination, and in which there is no appreciable loss of chloride from the system. The invention includes the combination with the chlorination step of the recovery of all chlorine as a gas so that the recovered gas can be reused in the chlorination step. The process has the overall advantage that it is pollution-free with no chlorine gas escaping from the system and no lead or sulfur compounds or vapors being released to the atmosphere.

What is claimed is:

1. A process for recovering metals from a sulfide ore concentrate containing lead, silver and zinc sulfides comprising the steps of:
   a. chlorinating the concentrate to convert the metal sulfides to metal chlorides and convert the sulfide sulfur in the ore to elemental sulfur;
   b. leaching the residue of step (a) with aqueous sodium chloride to dissolve lead and silver chlorides and remove these chlorides from the remaining solids;
   c. cooling the sodium chloride leach solution to precipitate substantially all of the lead chloride followed by separating it from the leach solution;
   d. recovering the silver from the lead chloride depleted leach solution remaining from step (c);
   e. removing a bleed stream from the solution remaining from step (d) and recycling the remainder of the solution to the leach solution of step (b);
   f. removing substantially all of the zinc and other impurities from the bleed stream;
   g. subjecting the bleed stream to electrolysis to produce chlorine gas;
   h. recycling the purified bleed stream to leaching step (b); and
   i. recycling the chlorine gas to the chlorination step (a).

2. The process of claim 1 performed continuously.

3. The process of claim 1 in which any lead and silver remaining in the bleed stream of step (e) is removed by iron cementation before removal of zinc in step (f).

4. The process of claim 1 in which zinc is removed from the bleed stream of step (f) by neutralizing the bleed stream with sodium carbonate to form sodium chloride and zinc carbonate.

5. The process of claim 4 in which sodium hydroxide formed in the electrolysis of sodium chloride in step (g) is carbonated to form sodium carbonate which is recycled to the neutralization step.

6. The process of claim 1 in which the bleed stream of step (h) is concentrated before recycling to leaching step (b).

7. The process of claim 1 in which the concentrate is chlorinated in step (a) by dry chlorination with dry chlorine gas.

8. The process of claim 7 in which the dry chlorination is carried out at a temperature below the melting point of elemental sulfur.

9. The process of claim 7 in which the temperature of dry chlorination is from about 50° C to 150° C.

10. The process of claim 7 in which the sodium chloride leach solution contains from about 250 to 300 grams per liter of solution of sodium chloride.

11. The process of claim 7 in which the concentrate is galena/tetrahedrite ore.

12. The process of claim 1 in which the leaching step (b) is carried out at about 80° C to 100° C.

13. The process of claim 1 in which the sodium chloride leach solution in step (c) is cooled to about 20° C to precipitate lead chloride.

14. The process of claim 1 in which the silver is recovered in step (d) by cementation with metallic iron.

15. The process of claim 1 in which the concentrate is chlorinated in step (a) by a wet chlorination step.

16. A process for treating a galena/tetrahedrite ore concentrate including lead, silver, antimony and zinc sulfides comprising the steps of:
   a. dry chlorinating the pulverized concentrate with chlorine gas to convert the sulfides to chlorides, volatilize the antimony chloride, and convert the sulfide sulfur to elemental sulfur, said chlorination being carried out at a temperature of from about 50° C to 150° C;
   b. leaching at a temperature of about 80° C to 100° C, the residue from step (a) with an aqueous sodium chloride solution containing about 250 to 300 grams/liter of sodium chloride to dissolve lead chloride and silver chloride to extract these chlorides from the remaining solids;
   c. cooling the sodium chloride leach solution from step (b) to about 20° C to precipitate substantially all of the lead chloride and separating the lead chloride therefrom;
   d. fusing the lead chloride from step (c) and electrolyzing the fused salt to produce chlorine gas and lead;
   e. recycling the chlorine gas from step (d) to step (a);
   f. recovering the silver from the lead chloride depleted leach solution remaining from step (c) by cementation with metallic iron;
   g. removing from about 5% to 15% by weight of the silver and lead depleted leach solution from step (f) as a bleed stream and recycling the remainder of the solution to the leach solution of step (b);
   h. removing any lead and silver remaining in the bleed stream by iron cementation;
   i. precipitating zinc and other impurities from the bleed stream with sodium carbonate;
   j. regenerating chlorine gas from sodium chloride in the bleed solution by electrolysis;
   k. recycling the chlorine gas from step (j) to the dry chlorination step of step (a);
   l. carbonating the sodium hydroxide formed in step (j) to form sodium carbonate and recycling the sodium carbonate to precipitation step (i); and
   m. recycling sodium chloride solution from step (j) to the leaching step (b).

17. The process of claim 16 in which the concentrate includes arsenic sulfide and the arsenic is volatilized in dry chlorination step (a).

18. In the process of recovering metals from sulfide ores containing at least the sulfides of lead, silver and zinc in which the sulfides are converted to elemental sulfur and chlorides by chlorination, the chlorides solubilized in sodium chloride, lead chloride removed from the leach solution by crystallization for recovery of lead, silver recovered from the leach solution by cementation, the leach solution after removal of lead and silver therefrom recycled to the sodium chloride leaching step, the improvement comprising preventing the build-up of zinc in the leach solution in the leaching step by removing a bleed stream from the lead and silver depleted leach solution, removing zinc from the bleed stream and recycling the bleed stream to the leaching solution in the leaching step.

19. The process of claim 18 including subjecting the bleed stream to electrolysis after removal of zinc therefrom to produce chlorine gas and recycling the chlorine gas to the dry chlorination step.

20. The process of claim 19 in which the zinc is removed by precipitating it as zinc carbonate by the addition of sodium carbonate, the sodium hydroxide produced in the electrolyis is carbonated to sodium carbonate and the sodium carbonate recycled to the zinc precipitation step.

21. The process of recovering metal values from minerals of the polymorphic series of complex metal sulfides tetrahedrite-tennantite comprising:
 a. subjecting the minerals to dry chlorination with chlorine gas in the absence of oxygen at a temperature between about 50° C and the melting point of sulfur to convert substantially all of the sulfide sulfur to elemental sulfur in solid form and to effect conversion of the metal compounds to metal chlorides, and recovering metal from the chlorides.

22. The process of claim 21 in which chlorination is performed at a temperature between about 80° C and the melting point of sulfur.

23. The process of claim 21 in which the minerals contain silver.

24. The process of claim 23 in which the silver containing mineral is tetrahedrite.

25. The process of claim 21 in which sulfur chlorides formed during dry chlorination are reacted with the metal sulfides to form metal chlorides and elemental sulfur.

26. The process of claim 25 in which the process is performed by introducing the metal sulfides and dry chlorine gas countercurrently into the reaction zone and an inert sweep gas is introduced into the reaction zone to bring sulfur chlorides formed during the dry chlorination into contact with metal sulfides entering the reaction zone.

* * * * *